United States Patent
Porras et al.

(10) Patent No.: US 8,806,457 B2
(45) Date of Patent: Aug. 12, 2014

(54) DEFERRED CONSTANT POOL GENERATION

(75) Inventors: Victor Leonel Hernandez Porras, San Francisco, CA (US); Roger Scott Hoover, Cheyenne, WY (US); Christopher Arthur Lattner, San Jose, CA (US); Eric Marshall Christopher, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 1199 days.

(21) Appl. No.: 12/316,761

(22) Filed: Dec. 15, 2008

(65) Prior Publication Data

US 2010/0153936 A1 Jun. 17, 2010

(51) Int. Cl.
*G06F 9/44* (2006.01)
*G06F 9/45* (2006.01)

(52) U.S. Cl.
USPC .............................. 717/146; 717/147; 717/151

(58) Field of Classification Search
None
See application file for complete search history.

(56) References Cited

U.S. PATENT DOCUMENTS

| | | | |
|---|---|---|---|
| 5,636,352 A * | 6/1997 | Bealkowski et al. | 712/208 |
| 6,275,830 B1 * | 8/2001 | Muthukkaruppan et al. | 1/1 |
| 6,308,317 B1 * | 10/2001 | Wilkinson et al. | 717/139 |
| 6,327,702 B1 * | 12/2001 | Sauntry et al. | 717/118 |
| 6,651,248 B1 * | 11/2003 | Alpern | 717/162 |
| 6,704,927 B1 * | 3/2004 | Bak et al. | 717/151 |
| 6,732,108 B2 * | 5/2004 | Factor et al. | 1/1 |
| 6,922,824 B2 * | 7/2005 | Swetland | 717/117 |
| 6,951,014 B1 * | 9/2005 | Sokolov | 717/139 |
| 6,973,646 B1 * | 12/2005 | Bordawekar et al. | 717/146 |
| 7,039,904 B2 * | 5/2006 | Sokolov | 717/147 |
| 7,058,934 B2 * | 6/2006 | Sokolov | 717/147 |
| 7,117,489 B2 * | 10/2006 | Wallman et al. | 717/151 |
| 7,228,533 B2 * | 6/2007 | Sokolov | 717/147 |
| 7,240,341 B2 * | 7/2007 | Plummer et al. | 717/148 |
| 7,278,137 B1 * | 10/2007 | Fuhler et al. | 717/153 |
| 7,293,260 B1 * | 11/2007 | Dmitriev | 717/151 |
| 7,543,288 B2 * | 6/2009 | Sokolov et al. | 718/1 |
| 7,574,700 B2 * | 8/2009 | Bracha | 717/151 |
| 7,665,075 B1 * | 2/2010 | Daynes et al. | 717/148 |
| 7,913,240 B2 * | 3/2011 | Kielstra et al. | 717/147 |
| 8,042,103 B2 * | 10/2011 | Burka et al. | 717/147 |
| 8,365,156 B2 * | 1/2013 | Sollich | 717/146 |
| 8,375,373 B2 * | 2/2013 | Sollich | 717/146 |
| 8,392,897 B2 * | 3/2013 | Franz et al. | 717/146 |
| 2002/0133638 A1 * | 9/2002 | Daynes et al. | 717/146 |
| 2004/0154008 A1 * | 8/2004 | Bak et al. | 717/151 |
| 2005/0193373 A1 * | 9/2005 | Wannamaker et al. | 717/118 |
| 2006/0026574 A1 * | 2/2006 | Lesot et al. | 717/146 |
| 2008/0263529 A1 * | 10/2008 | Beretta | 717/146 |

OTHER PUBLICATIONS

Lattner, "The LLVM Compiler System", Mar. 2007; Published online; [retrieved on Apr. 27, 2012]; Retrieved from Internet <URL:http://llvm.org/pubs/2007-03-12-BossaLLVMIntro.pdf>;pp. 1-29.*

(Continued)

*Primary Examiner* — Xi D Chen
(74) *Attorney, Agent, or Firm* — Womble Carlyle Sandridge & Rice LLP

(57) ABSTRACT

Deferred constant pool generation is disclosed. Optimization processing is performed with respect to an intermediate representation of a source code. The optimized intermediate representation is used to generate a constant pool. In some embodiments, the source code comprises JavaScript, which is used to generate a low level virtual machine (LLVM) or other intermediate representation (IR), which intermediate representation is optimized prior to a constant pool being generated.

15 Claims, 6 Drawing Sheets

(56) References Cited

OTHER PUBLICATIONS

Aslam, et al., "Introducing TakaTuka: a Java virtual machine for motes"; Nov. 2008, Proceedings of the 6$^{th}$ ACM conference on Embedded network sensor systems; [retrieved on Sep. 30, 2013], Retrieved from Internet <URL:http://dl.acm.org/citation.cfm?id=1460472>;pp. 399-400.*

Wang, Lin, "Jato: A compact binary file format for Java class"; 2001 IEEE; [retrieved on Apr. 5, 2014]; Retrieved from Internet <URL:http://ieeexplore.ieee.org/stamp/stamp.jsp?tp=&arnumber=934855>;pp. 467-474.*

Schatzl, et al., "Optimized Memory Management for Class Metadata in a JVM"; 2011 ACM; [retrieved on Apr. 5, 2014]; Retrieved from Internet <URL:http://dl.acm.org/citation.cfm?id=2093157>;pp. 151-160.*

Foley, "Tactics for Minimal Interference from Class Loading in Real-Time Java"; 2007 ACM; [retrieved on Apr. 5, 2014]; Retrieved from Internet <URL:http://dl.acm.org/citation.cfm?id=1288940>;pp. 23-32.*

Conte, et al., "A Study of Code Reuse and Sharing Characteristics of Java Applications"; 1999 ACM; [retrieved on Apr. 5, 2014]; Retrieved from Internet <URL:http://ieeexplore.ieee.org/stamp/stamp.jsp?tp=&arnumber=809356>;pp. 1-9.*

* cited by examiner

DEFERRED CONSTANT POOL GENERATION

BACKGROUND OF THE INVENTION

A "constant pool" is a table or other data structure in which one or more constants, i.e., values that do not change during a relevant time interval, for example during program execution, are stored centrally and from which the value of a constant typically is obtained by associated software code. For example, for each Java class, constants used by methods of the class are stored in a constant table associated with the class, and such methods have and use references to values in the constant table. Certain scripting or other traditionally interpreted programming languages, such as JavaScript, do not natively define a constant pool. Instead, temporary objects or other structures are created dynamically to store constants and other values on which code comprising a script, applet, or other body of code operate.

In some cases, JavaScript or other traditionally interpreted code may be compiled into an intermediate representation (such as byte code) or into machine code, for example to enable the compiled code to be executed in place of the original traditionally interpreted code, which typically affords performance advantages. FIGS. 1A and 1B are block diagrams illustrating prior art systems for compiling source code, including source code in a traditionally interpreted programming language, such as JavaScript. In the example shown in FIG. 1A, source code 102 is compiled by a compiler 104 to generate machine code 106. In the example shown in FIG. 1B, source code 122 is processed by an initial byte code generator 124 to generate an initial intermediate representation of the source code. Subsequently, a compiler 126 is used to perform optimization processing on the byte code and to generate machine code 128 based on the optimized byte code.

Traditionally, when compiling code written in a traditionally interpreted or other language that does not use the constant pool approach, constants in the source code are identified and code to store such constants in a constant pool is generated in connection with initial code generation, i.e., the first stage of code generation based directly on the original source code, such as the initial byte code generated by byte code generator 124 in the example shown in FIG. 1B. Optimizations traditionally have been performed on such initially generated code prior to final, optimized machine code being generated. FIG. 2 is a flow diagram illustrating a prior art process for compiling source code. In the example shown in FIG. 2, source code (202) is analyzed to create a constant pool (204), e.g., in connection with initial code generation based on the source code. Subsequent to initial code generation and constant pool creation, optimizations are performed and optimized machine code generated (206).

BRIEF DESCRIPTION OF THE DRAWINGS

Various embodiments of the invention are disclosed in the following detailed description and the accompanying drawings.

DETAILED DESCRIPTION

Figure 1A:
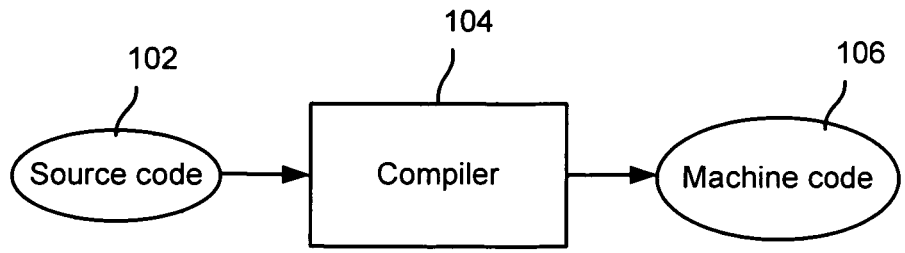
FIGS. 1A and 1B are block diagrams illustrating prior art systems for compiling source code, including source code in a traditionally interpreted programming language, such as JavaScript.
Figure 1B:
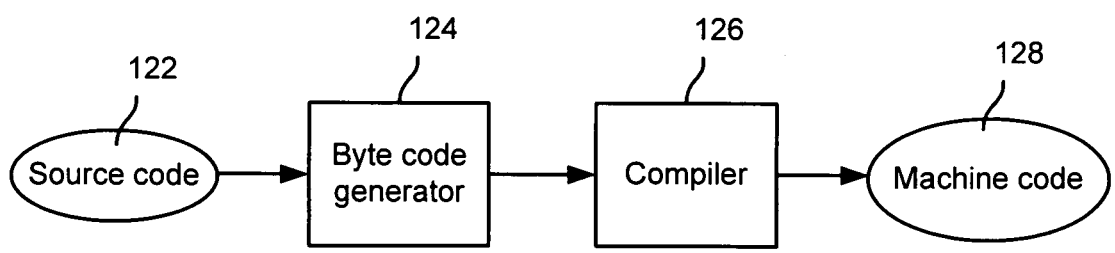
Figure 2:
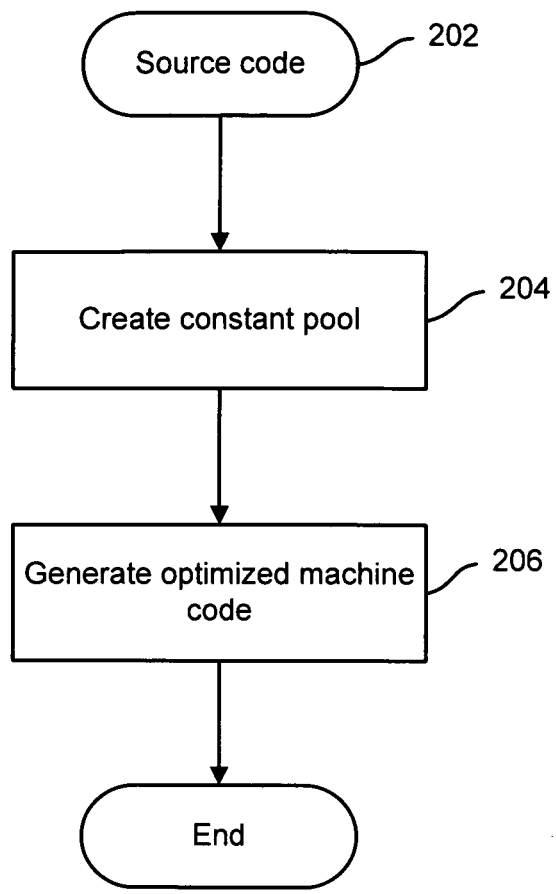
FIG. 2 is a flow diagram illustrating a prior art process for compiling source code.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Deferred constant pool generation is disclosed. In some embodiments, when compiling JavaScript or other traditionally interpreted code, constant pool generation is not performed in connection with initial creation of an intermediate representation, such as bytecode. Instead, initial intermediate representation is generated without identifying constants and generating intermediate representation configured to store such constants in and access such constants from a constant pool. The initial intermediate representation undergoes one or more stages of optimization processing, prior to constant pool generation. The optimized intermediate representation is used to generate a constant pool prior to machine code being generated. In this way, optimizations that could not have been performed had constants been placed in a constant pool in connection with initial code generation can be performed, and optimization processing does not result in any errors or inefficient code being generated by virtue of the constant pool having been generated in connection with initial code generation.

Traditionally, compilers have generated constant pools in connection with initial code generation based directly on a source code being compiled. During initial code generation, the original source code traditionally has been analyzed programmatically to detect patterns of common constant value usage and each constant so detected stored in a constant pool. For source code referencing and/or otherwise using a constant, initially intermediate representation, e.g., initial byte code, would be configured to reference the constant as stored in the constant pool. In the traditional approach, optimization processing is performed on the initial intermediate representation, e.g., initial byte code, so generated. However, in some cases generating a constant pool in connection with initial code generation may prevent certain optimizations that could otherwise have been performed from being performed. In addition, optimization processing after constant pool generation may in some cases result in errors, or at a minimum less than the full benefit of the constant pool technique being achieved.

Figure 3:
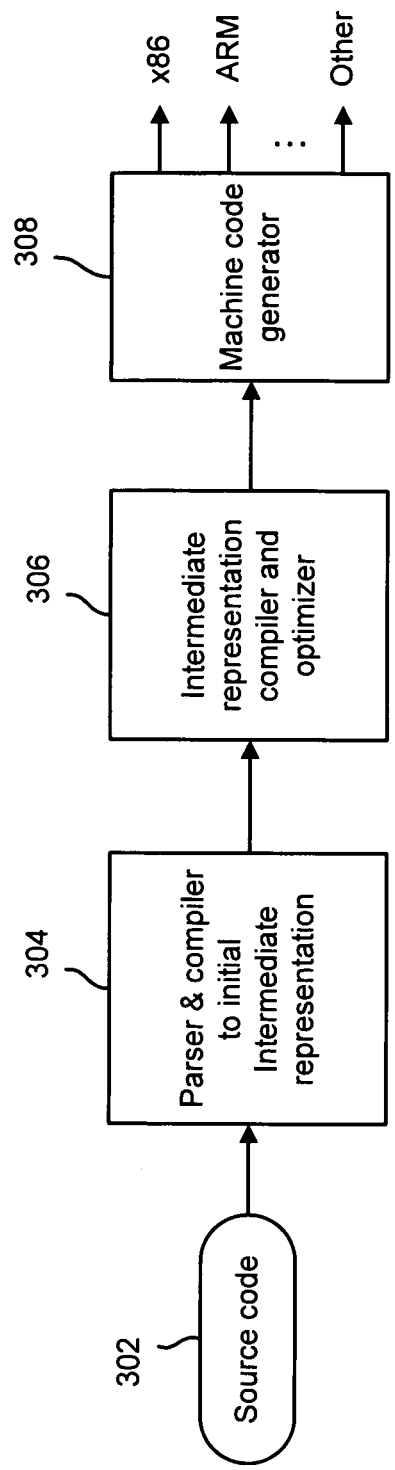
FIG. 3 is a block diagram illustrating an embodiment of a system for compiling source code.

FIG. 3 is a block diagram illustrating an embodiment of a system for compiling source code. In the example shown, source code 302, such as JavaScript or other code written in a traditionally interpreted programming language, or other source code in a programming language that does not native use constant pools, is processed by a parser and initial intermediate representation generator 304, which generates an initial intermediate representation (e.g., byte code) based on the source code, without initially generating a constant pool. The initially generated code is provided to an optimization and second (and/or final) stage compiler 306 which generates an optimized intermediate representation of the source code, such as LLVM IR or another relatively low level representation of the byte code. The LLVM IR or other intermediate representation is analyzed programmatically to detect patterns of constant value usage, and constants so detected are pulled into a constant pool. In various embodiments, the initially generated code is used to generate a relatively low level intermediate language that exposes, encodes, or otherwise reflects the program structure of the original source code to a sufficient degree to enable patterns of constant value usage to be detected programmatically. In some embodiments, LLVM intermediate representation (IR) or relatively low level code that incorporates variable type information is generated, and such type information is used to detect patterns of constant value usage and to create the constant pool. A machine code generator 308 receives the optimized LLVM IR and generates device-appropriate machine code for one or more device and/or processor architectures.

Figure 4:
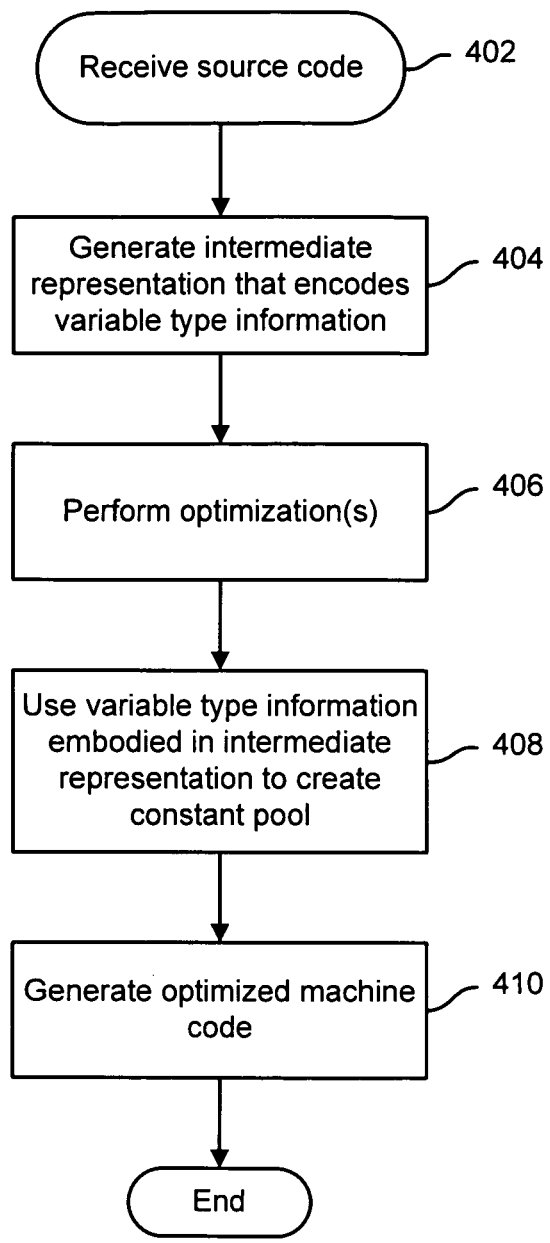
FIG. 4 is a flow diagram illustrating an embodiment of a process for compiling code.

FIG. 4 is a flow diagram illustrating an embodiment of a process for compiling code. In the example shown, received source code (402) is used to generate an intermediate representation that encodes or otherwise provides variable type information, such as LLVM IR (404). One or more optimizations are performed (406). The variable type information embodied in the intermediate representation is used to create a constant pool, e.g., by detecting programmatically patterns of constant value usage (408). Once the constant pool has been created, the optimized intermediate representation is used to generate optimized machine code (410).

Figure 5:
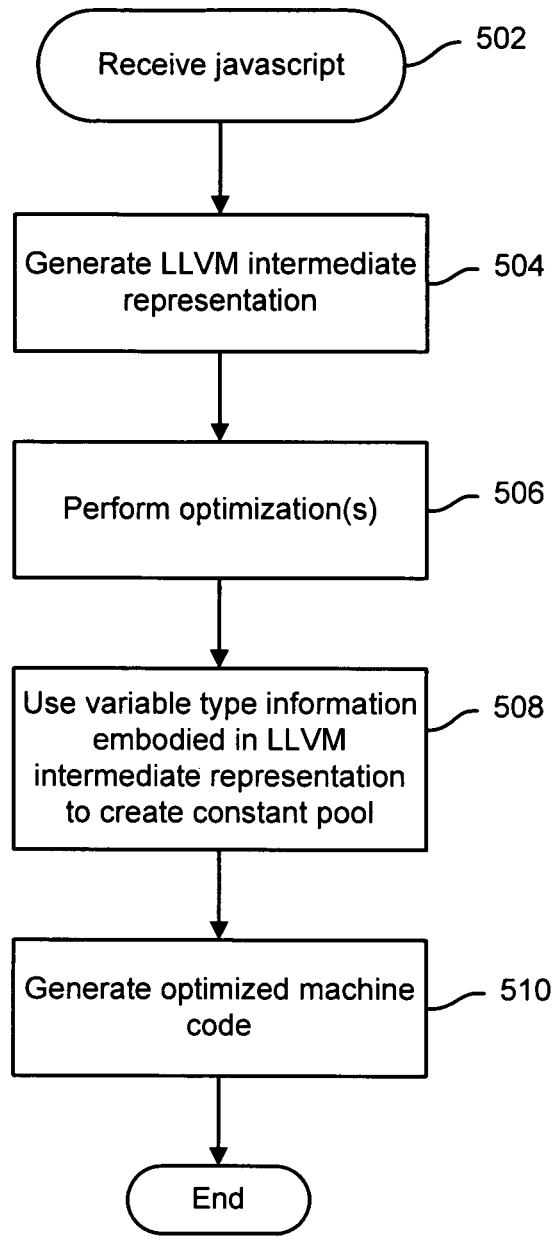
FIG. 5 is a flow diagram illustrating an embodiment of a process for compiling JavaScript code.

FIG. 5 is a flow diagram illustrating an embodiment of a process for compiling JavaScript code. In the example shown, received JavaScript code (502) is used to generate an LLVM IR representation of the JavaScript (504). One or more optimizations are performed on the LLVM IR (506). Variable type information embodied in the LLVM IR is used to create a constant pool, e.g., by detecting programmatically patterns of constant value usage (508). Once the constant pool has been created, the optimized LLVM IR is used to generate optimized machine code (510).

By deferring constant pool creation until after one or more optimizations have been performed on an intermediate representation of a source code, such as JavaScript code or code written in another programming language that does not natively use constant pools, more highly optimized intermediate representation and consequently more highly optimized machine code can be created, without generating constant pool related errors, while achieving the benefits of using a constant pool to manage and store constants.

Figure 6:
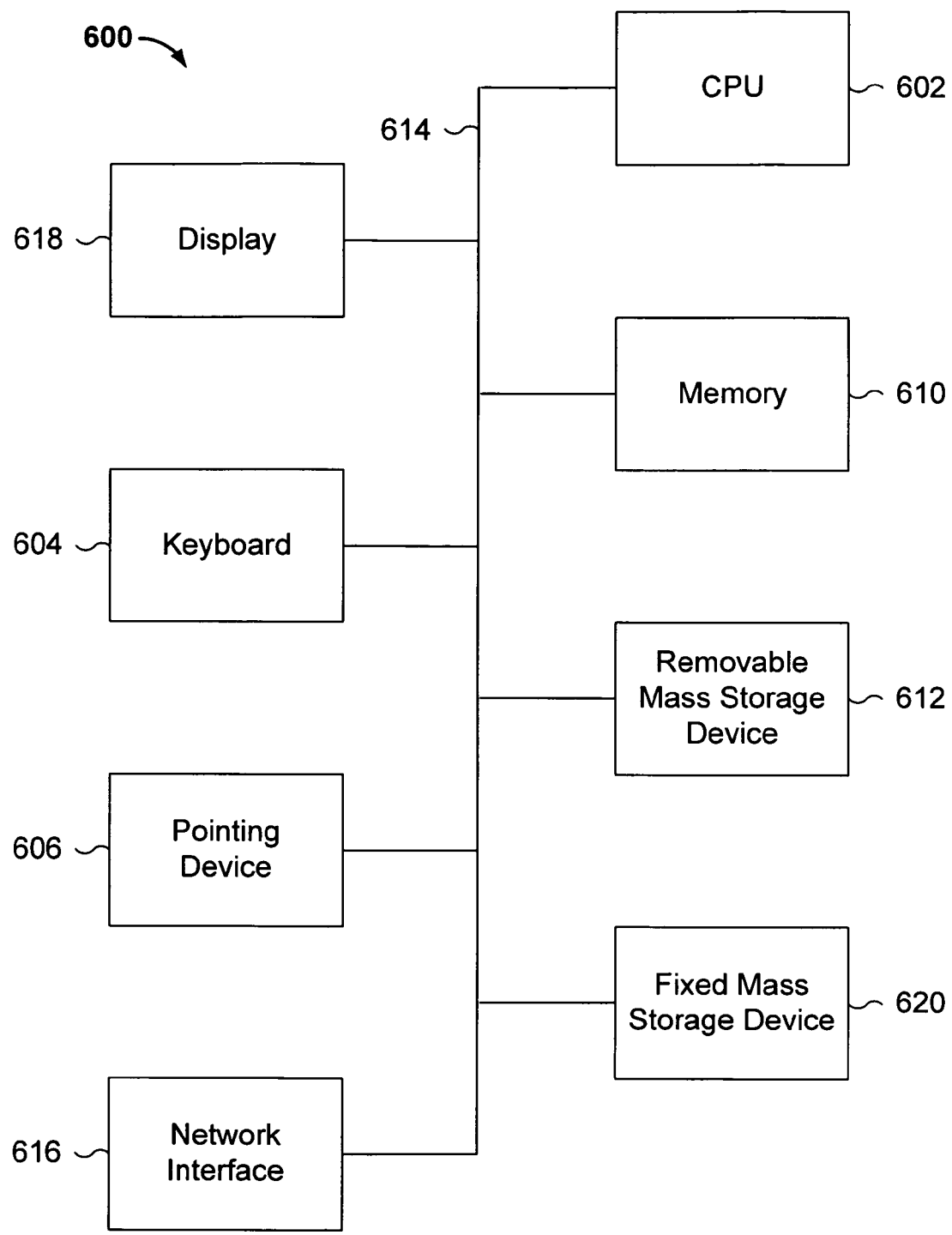
FIG. 6 is a block diagram of a computer system 600 used in some embodiments to compile JavaScript or other code.

FIG. 6 is a block diagram of a computer system 600 used in some embodiments to compile JavaScript or other code. FIG. 6 illustrates one embodiment of a general purpose computer system. Other computer system architectures and configurations can be used for carrying out the processing of the present invention. Computer system 600, made up of various subsystems described below, includes at least one microprocessor subsystem (also referred to as a central processing unit, or CPU) 602. That is, CPU 602 can be implemented by a single-chip processor or by multiple processors. In some embodiments CPU 602 is a general purpose digital processor which controls the operation of the computer system 600. Using instructions retrieved from memory 610, the CPU 602 controls the reception and manipulation of input data, and the output and display of data on output devices. In some embodiments, CPU 602 comprises and/or is used to provide the parser & compiler 304, compiler & optimizer 306, and/or machine code generator 308 of FIG. 3 and/or implements the processes of FIGS. 4 and/or 5.

CPU 602 is coupled bi-directionally with memory 610 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 602. Also as well known in the art, primary storage typically includes basic operating instructions, program code, data and objects used by the CPU 602 to perform its functions. Primary storage devices 610 may include any suitable computer-readable storage media, described below, depending on whether, for example, data access needs to be bi-directional or uni-directional. CPU. 602 can also directly and very rapidly retrieve and store frequently needed data in a cache memory (not shown).

A removable mass storage device 612 provides additional data storage capacity for the computer system 600, and is coupled either bi-directionally (read/write) or uni-directionally (read only) to CPU 602. Storage 612 may also include computer-readable media such as magnetic tape, flash memory, signals embodied on a carrier wave, PC-CARDS, portable mass storage devices, holographic storage devices, and other storage devices. A fixed mass storage 620 can also provide additional data storage capacity. The most common example of mass storage 620 is a hard disk drive. Mass storage 612, 620 generally store additional programming instructions, data, and the like that typically are not in active use by the CPU 602. It will be appreciated that the information retained within mass storage 612, 620 may be incorporated, if needed, in standard fashion as part of primary storage 610 (e.g. RAM) as virtual memory.

In addition to providing CPU 602 access to storage subsystems, bus 614 can be used to provide access other subsystems and devices as well. In the described embodiment, these can include a display monitor 618, a network interface 616, a keyboard 604, and a pointing device 606, as well as an auxiliary input/output device interface, a sound card, speakers, and other subsystems as needed. The pointing device 606 may be a mouse, stylus, track ball, or tablet, and is useful for interacting with a graphical user interface.

The network interface 616 allows CPU 602 to be coupled to another computer, computer network, or telecommunications network using a network connection as shown. Through the network interface 616, it is contemplated that the CPU 602 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 602 can be used to connect the computer system 600 to an external network and transfer data according to standard protocols. That is, method embodiments of the present invention may execute solely upon CPU 602, or may be performed across a network such as the Internet, intranet networks, or local area networks, in conjunction with a remote CPU that shares a portion of the processing. Additional mass storage devices (not shown) may also be connected to CPU 602 through network interface 616.

An auxiliary I/O device interface (not shown) can be used in conjunction with computer system 600. The auxiliary I/O device interface can include general and customized interfaces that allow the CPU 602 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contains program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 6 is but an example of a computer system suitable for use with the invention. Other computer systems suitable for use with the invention may include additional or fewer subsystems. In addition, bus 614 is illustrative of any interconnection scheme serving to link the subsystems. Other computer architectures having different configurations of subsystems may also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for compiling software code, comprising:
    generating, at a first stage of a compiler, a byte code representation of a source code, wherein the generating does not include creating a constant pool for the byte code representation of the source code; performing, at a second stage of the compiler, two or more optimizations on the byte code representation of the source code to produce an optimized byte code representation, wherein the two or more optimizations could not be performed if the constant pool had been generated along with the byte code representation at the first stage of the compiler;
    identifying, at the second stage of the compiler, and using variable type information included in the optimized byte code representation, a pattern of constant value usage in the optimized byte code representation;
    generating, at the second stage of the compiler, a constant pool based upon the identified pattern of constant value usage; and
    generating, at a third stage of the compiler, machine code based upon the optimized byte code representation subsequent to generation of the constant pool.

2. The computer-implemented method of claim 1, further comprising receiving the source code.

3. The computer-implemented method of claim 1, wherein the byte code representation comprises a low level virtual machine (LLVM) intermediate representation (IR).

4. The computer-implemented method of claim 1, wherein the source code comprises JavaScript.

5. The computer-implemented method of claim 1, wherein the byte code representation exposes a program structure of the source code to a degree sufficient to enable a pattern of constant value usage to be detected programmatically.

6. A system for processing software code, comprising:
    a memory configured to store a source code; and
    a processor coupled to the memory and configured to:
        generate, at a first stage of a compiler, a byte code representation of a source code, wherein the generating does not include creating a constant pool for the byte code representation of the source code;
        perform, at a second stage of the compiler, two or more optimizations on the byte code representation of the source code to produce an optimized byte code representation, wherein the two or more optimizations could not be performed if the constant pool had been generated along with the byte code representation at the first stage of the compiler;
        identify, at the second stage of the compiler, and using variable type information included in the optimized byte code representation, a pattern of constant value usage in the optimized byte code representation;
        generate, at the second stage of the compiler, a constant pool based upon the identified pattern of constant value usage; and
        generate, at a third stage of the compiler, machine code based upon the optimized byte code representation subsequent to generation of the constant pool.

7. The system of claim 6, wherein the byte code representation comprises an LLVM intermediate representation (IR).

8. The system of claim 6, wherein the source code comprises JavaScript.

9. The system of claim 6, wherein the processor is further configured to receive the source code.

10. The system of claim 6, wherein the byte code representation exposes a program structure of the source code to a degree sufficient to enable a pattern of constant value usage to be detected programmatically.

11. A non-transitory computer readable storage medium storing instructions that, when executed by a processor included in a computing device, cause the computing device to carry out steps that include:

generating, at a first stage of a compiler, a byte code representation of a source code, wherein the generating does not include creating a constant pool for the byte code representation of the source code;

performing, at a second stage of the compiler, two or more optimizations on the byte code representation of the source code to produce an optimized byte code representation, wherein the two or more optimizations could not be performed if the constant pool had been generated along with the byte code representation at the first stage of the compiler;

identifying, at the second stage of the compiler, using variable type information included in the optimized byte code representation, a pattern of constant value usage in the optimized byte code representation;

generating, at the second stage of the compiler, a constant pool based upon the identified pattern of constant value usage; and generating, at a third stage of the compiler, machine code based upon the optimized byte code representation subsequent to generation of the constant pool.

12. The non-transitory computer readable storage medium of claim 11, wherein the steps further include receiving the source code.

13. The non-transitory computer readable storage medium of claim 11, wherein the byte code representation comprises a low level virtual machine (LLVM) intermediate representation (IR).

14. The non-transitory computer readable storage medium of claim 11, wherein the source code comprises JavaScript.

15. The non-transitory computer readable storage medium of claim 11, wherein the byte code representation exposes a program structure of the source code to a degree sufficient to enable a pattern of constant value usage to be detected programmatically.

* * * * *